Figures 1, 2:
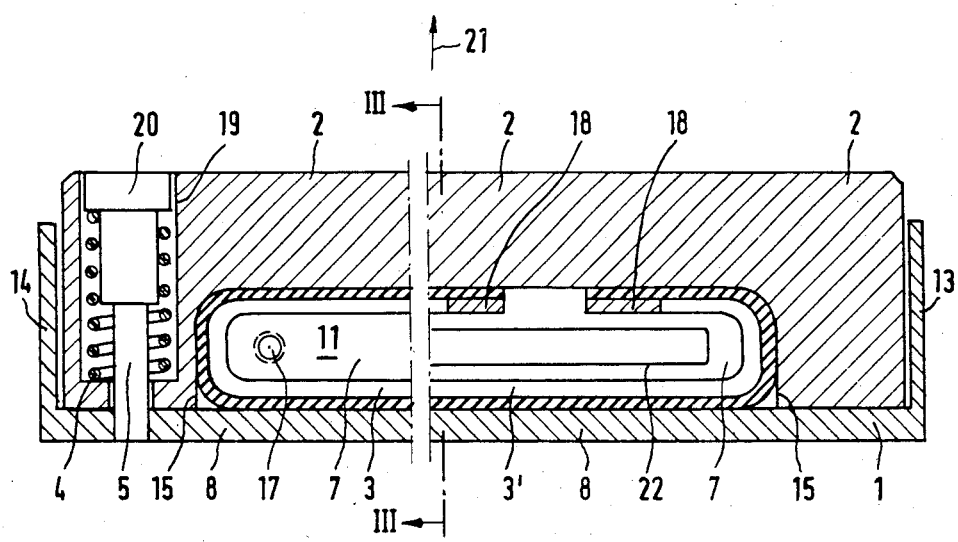

United States Patent [19]

Emmert

[11] Patent Number: 4,638,724
[45] Date of Patent: Jan. 27, 1987

[54] DEVICE FOR PRODUCING MECHANICAL FORCE BY PRESSURE OF A FLUID

[76] Inventor: Manfred Emmert, Postfach 12, 7859 Efringen-Kirchen, Fed. Rep. of Germany

[21] Appl. No.: 740,693

[22] Filed: Jun. 3, 1985

Related U.S. Application Data

[62] Division of Ser. No. 563,412, Nov. 29, 1983, Pat. No. 4,543,877.

[30] Foreign Application Priority Data

Apr. 1, 1982 [DE] Fed. Rep. of Germany ....... 3212155
May 5, 1982 [DE] Fed. Rep. of Germany ....... 3216753
Mar. 24, 1983 [WO] PCT Int'l Appl. ... PCT/DE83/0055

[51] Int. Cl.$^4$ ............................. F16J 1/10; F16J 3/00; F01B 19/00
[52] U.S. Cl. ............................... 92/84; 92/92; 92/94
[58] Field of Search ................. 92/84, 89, 90, 91, 92, 92/94, 130 R, 130 B, 137

[56] References Cited

U.S. PATENT DOCUMENTS

| 345,446 | 7/1886 | Powers | 92/89 |
| 3,025,072 | 3/1962 | Cahill | 279/4 |
| 3,663,027 | 5/1972 | Klipping | 279/4 |
| 3,815,464 | 6/1974 | Frost | 92/90 X |
| 4,543,877 | 10/1985 | Emmert | 92/90 |

FOREIGN PATENT DOCUMENTS

| 2105632 | 4/1972 | France . |
| 2214055 | 8/1974 | France . |
| 2278968 | 12/1976 | France . |
| 2448060 | 8/1980 | France . |
| 1604686 | 12/1981 | United Kingdom . |
| 569764 | 9/1977 | U.S.S.R. | 92/90 |

Primary Examiner—Robert E. Garrett
Assistant Examiner—George Kapsalas
Attorney, Agent, or Firm—Pollock, Vande Sande & Priddy

[57] ABSTRACT

In a device for the production of pressure by means of a piston (2), the piston (2) which has a rectangular cross-section is arranged in a cylinder (1) whose cylinder bore has also a rectangular cross-section. A cylindrical sleeve (3) is arranged inside the cylinder (1) and its edges rest tightly against two parallel surfaces (11, 12) located opposite each other. When a pressure agent is led into the interior of the sleeve (3) over a cylinder wall (9), the sleeve (3) pushes the piston (2) with a high pressure out of the cylinder block.

9 Claims, 10 Drawing Figures

DEVICE FOR PRODUCING MECHANICAL FORCE BY PRESSURE OF A FLUID

This is a division of application Ser. No. 563,412, filed 11/29/83, now U.S. Pat. No. 4,543,877.

The invention concerns a device for the production of pressure by means of an elastic component on which a pressure agent can act and which is arranged between two parts movable relatively towards each other.

Customarily, pressure cylinders are used for the production of pressure which consist of a circular-cylindrical block and a piston moving in it. A connecting borehole ends in the interior of the cylinder for the supply and discharge of a pressure agent, for example, compressed air or hydraulic fluid. Gasket rings are arranged between the cylinder wall and the piston in order to prevent escape of pressure medium between the cylinder wall and the piston. A proper sealing between the piston and the cylinder wall is practically only possible when the piston and the cylinder bore have a circular cross-section.

In this instance, the piston pressure is dependent on the pressure of the pressure agent and on the piston surface. Since the pressure of the pressure agent is usually limited, it is necessary to design the piston surface as large as possible for high piston pressures which leads to cylinders with a large diameter whose installation often causes difficulties. Another difficulty of a large piston diameter is to be seen in the fact that the guiding of the piston in the cylinder and the sealing between the piston and the cylinder wall becomes problematic. In order to avoid the disadvantage of a large piston diameter, it is known to use stepped cylinders. However, they have a complicated structure and, therefore, they are expensive. Another disadvantage is to be seen in its relatively great structural length. Furthermore, it is known to have the piston act on a toggle lever mechanism for the production of a higher pressure than the operating pressure. This structure is also relatively complex and has additionally the disadvantage that it may not be possible to use it depending on the installation conditions. The described problems occur particularly with operating cylinders which are used for punching, pressing, cutting and stamping where the cylinders must produce high operating pressures with a relatively small stroke.

Additionally, flexible pressure vessels are known in the form of compressed air cushions. This is a question of oblong or round flat vessels of an elastic material which have a compressed air connection leading into the interior of the vessel. When these compressed air cushions are arranged between a rigid stop and a piston, then it is possible to perform cutting and reforming operations or similar ones or direct clamping operations, etc. using subsequent tools with the action of the compressed air on the compressed air cushions. Such compressed air cushions can also be arranged one after the other in order to increase the stroke of the piston. These compressed air cushions have a number of advantages in comparison with the aforementioned pressure cylinders. They exert, for example, a continuous area pressure which is more favorable for many cases of application than the almost point-shaped pressure exerted by a conventional piston.

The disadvantage is here that the compressed air cushions are relatively expensive since they must sustain a many times higher bursting pressure in comparison with the operating pressure for safety reasons. Furthermore, it is disadvantageous that they are sensitive to sharp edges and objects with sharp edges since they can damage the walls of the cushion. Also, their age resistance is negatively influenced particularly in an oxidizing atmosphere and under the effect of UV radiation.

It is the task to improve the device of the kind mentioned in the introduction in such a way that the elastic component can be designed in a simple form and, when the pressure acts on it, it rests in a casing which supports it all around and at least one of the supporting surfaces can be designed as an actuating element for the movable part of the device effecting the pressure action.

This task is accomplished with the characterizing features of claim 1. Advantageous further developments can be taken from the sub-claims.

A very simple design of the elastic component is given in an advantageous manner by this structure which, in principle, has the simple shape of a cylinder which is placed simply into the approximately quadrangle-shaped interior of a casing of the device with its axis diagonal to the pressure direction of the movable part. However, the elastic component may also have just the shape of a belt whose ends are fastened, depending on the design of the device, in a suitable manner so that a belt loop is obtained which will still be further explained.

The elastic components or the sleeve itself does not require a connecting nipple in this instance for the pressure agent supply which is effected through an opening in one of the walls of the casing against which one of the edges of the opening of the sleeve rests.

Since the sleeve is supported all around by walls, it must not be fully dimensioned or over-dimensioned with regard to the pressure load but it must only meet the expansion loads which can be determined without any difficulty.

Furthermore, the design of the device and particularly the sleeve which is open on both sides result in an advantageous and preferred possibility of a further development to the effect that the sleeve can serve as a drive for a toggle lever mechanism which is thus self-integrated into the device in an advantageous manner and which will still be explained.

Figure 3:
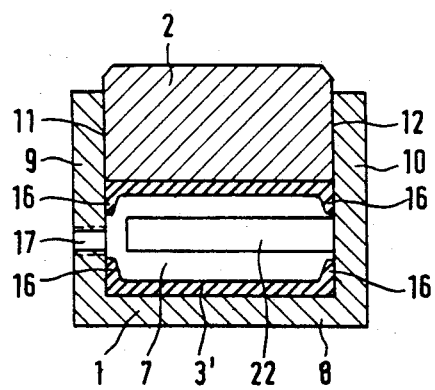
Figure 4:
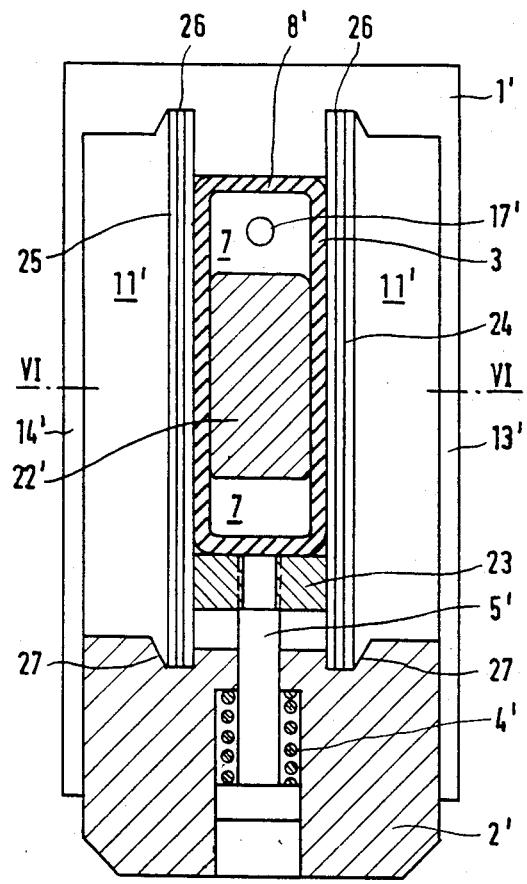
Figure 5:
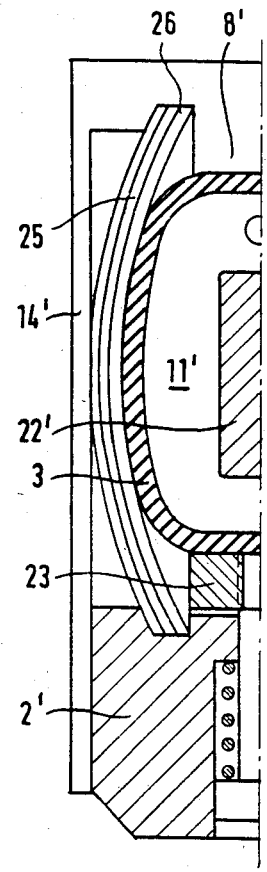
Figure 6:
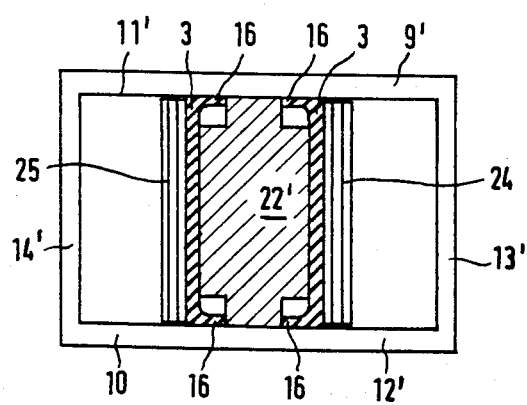
Figure 7:
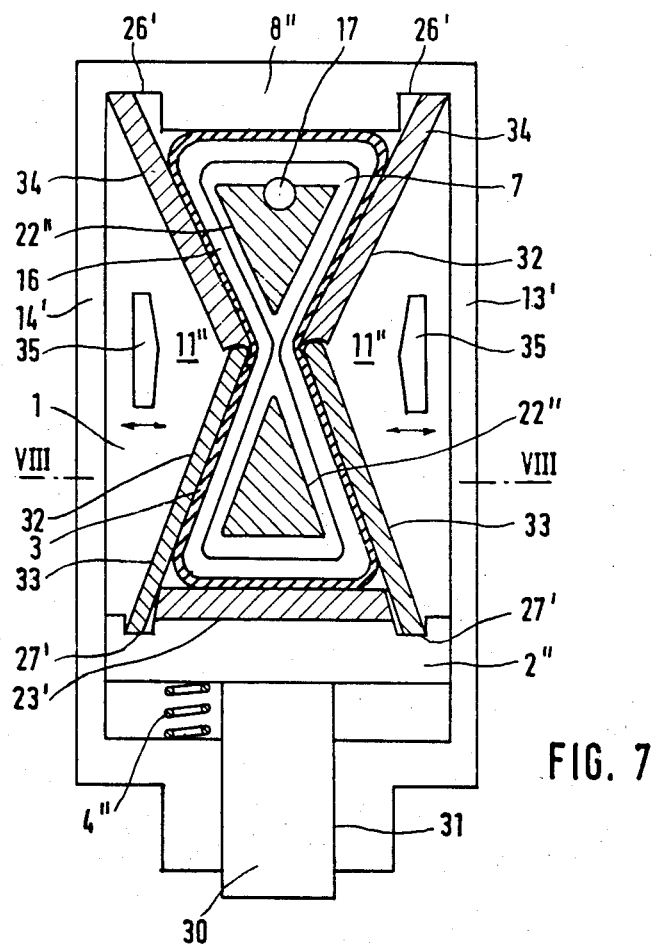
Figure 8:
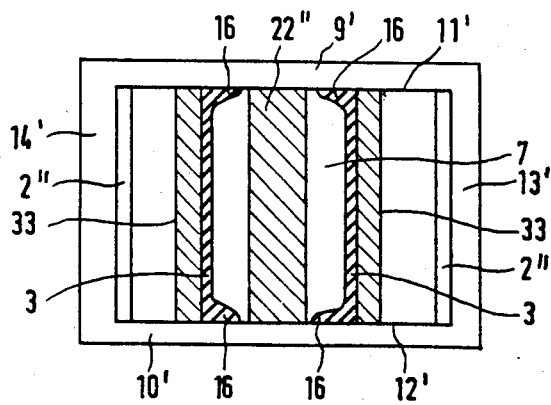
Figure 9:
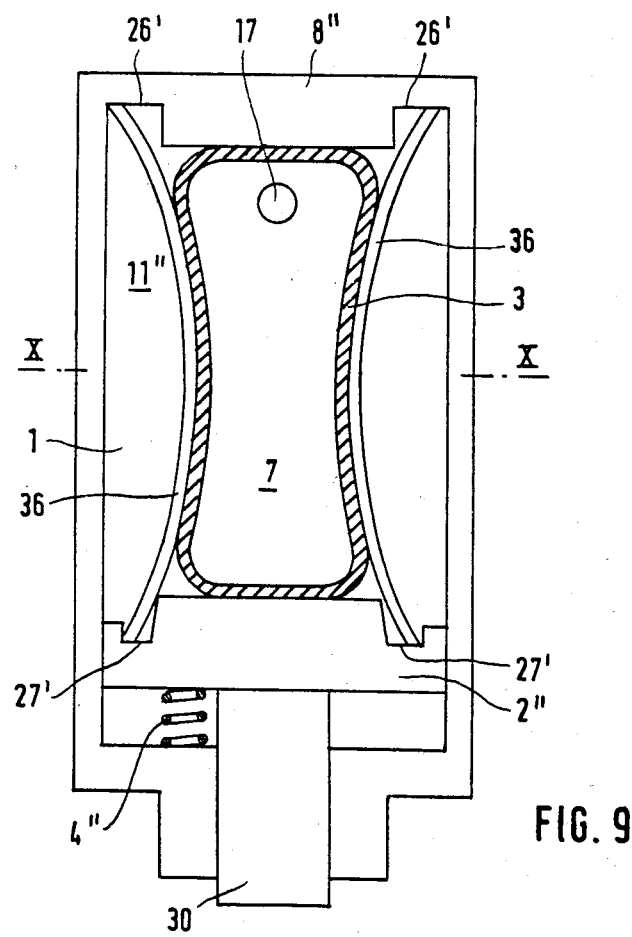
Figure 10:
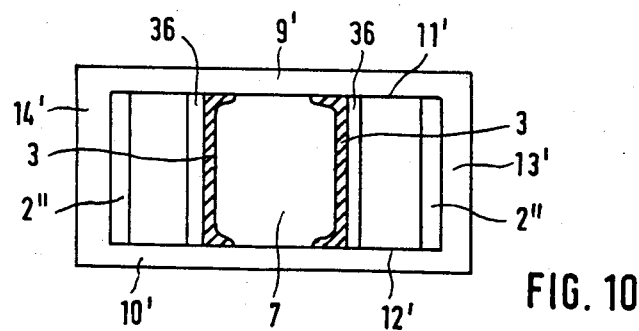

Exemplified embodiments will be further explained below with the help of the drawings. There are shown:

FIG. 1 a longitudinal cross-section through the left half of the first design;

FIG. 2 a longitudinal cross-section through the right portion of another design;

FIG. 3 a cross-section along the line III—III in FIG. 2;

FIG. 4 a longitudinal cross-section through a clamping cylinder not being acted upon;

FIG. 5 a longitudinal cross-section through the left portion of the cylinder according to FIG. 4 being acted upon;

FIG. 6 a cross-section along the line VI—VI in FIG. 4;

FIG. 7 a longitudinal cross-section through an operating cylinger with two toggle level mechanisms;

FIG. 8 a cross-section along the line VIII—VIII in FIG. 7;

FIG. 9 a longitudinal cross-section through an operating cylinder with a spring mechanism and FIG. 10 a cross-section along the line X—X in FIG. 9.

The piston 2 which is rectangular in its cross-section is arranged in a cup-shaped cylinder 1 which has also a rectangular cross-section.

The casing of the cylinder 1 consists of a lower side 8 from which two walls 9, 10 go off at a right angle. Their surfaces 11, 12 which are directed towards each other are plane and run in parallel towards each other. The piston 2 moves between these surfaces 11, 12. The casing of the cylinder 1 has two additional walls 13, 14 at a right angle to the walls 9, 10 and at a right angle to the lower side 8 between which the piston 2 is arranged with a certain play.

The piston 2 is provided with an oblong recess 15 on its lower side which has a U-shape in longitudinal direction and is open towards the lower side 8 of the cylinder 1. An elastic O-shaped sleeve 3 is arranged in this recess 15 which rests at the bottom against the lower side 8 of the cylinder 1. This sleeve 3 has sealing lips 16 which are directed into the interior 7 of the sleeve 3 and rest against the surfaces 11, 12. The wall 9 is provided with a connecting borehole 17 which communicates with the interior of the sleeve 3.

In the case of the exemplified embodiment according to FIG. 1, it is a question of a cylindrical O-shaped sleeve which is round before it is installed. However, the sleeve 3' according to FIG. 2 consists of a belt-shaped material. The two ends of this belt-shaped sleeve 3' are connected with the upper side of the U-shaped recess 15 in a gas and liquid-tight manner in the shown exemplified embodiment using strips 18, 18'. However, these ends can also be connected with the lower side 8 of the cylinder 1 using the same strips. An adhesive connection would also be possible.

Return springs can be provided on both ends of the piston 2 and cylinder 1. Such a design is shown on the left hand side of FIG. 1. In this instance, a screw bolt 5 is bolted with the lower side 8 of cylinder 1. A return spring 4 is arranged in a pocket borehole 19 of the piston 2 between this pocket borehole 19 and the head 20 of the screw bolt 5 and said return spring 4 pushes the piston 2 into the direction of the lower side 8 of the cylinder 1. The screw bolt 5 is bolted with the lower side 8 in an adjustable manner whereby the stroke of the piston 2 can be limited in an adjustable way.

When a pressure agent is pushed through the borehole 17 into the interior 7 of the sleeve 3 limited by the walls 9, 10, the piston 2 executes a stroke movement in the direction of the arrow 21. When the interior 7 of the sleeve 3 is vented, the piston 2 is returned into its shown original position by the spring 4.

A block 22 partially filling the interior of the sleeve 3 can be arranged between the two surfaces 11, 12. The clearance volume within the sleeve 3 is reduced by this block 22 as it is shown in FIGS. 2 and 3 and thus the volume of the pressure agent is reduced accordingly which must be introduced into the interior of the sleeve 3 until the stroke movement starts.

The device is distinguished by a rectangular design and the size can be adjusted for the respective purpose of its use. The piston 2 exerts a surface pressure whereby the pressure exerted by the piston 2 is higher in comparison with the pressure of a round cylinder having the same width. The height of the device is relatively low in this instance. Since the piston has a play vis-a-vis the walls 13, 14, the piston 2 can adjust to a slightly inclined position of the part upon which it acts. The device is characterized by the use of few individual parts whereby only the surfaces 11, 12 must be subjected to fine machining.

The device can be used for many purposes, such as, for example, lifting, clamping, pressing, pushing, stamping, cutting and punching, i.e. particularly there where the piston 2 shall exert a great force or a high pressure with a short stroke.

The principle of the use of a sleeve 3 consists of the fact that, with pressure acting on the interior 7 of the sleeve 3, the latter is inclined to adopt a circular shape whereby the piston 2 is moved in the direction of the arrow 21. With the given exemplified embodiment, the piston 2 exerts a force when pressure prevails in the interior 7 of the sleeve 3.

FIGS. 4 to 6 show a cylinder which is suitable, in the first place, as a clamping cylinder. In contrast to the example according to FIGS. 1 to 3, the piston 2' exerts a pressure in this instance when the interior 7 of the sleeve 3 is not acted upon by the pressure agent.

Those parts in FIGS. 4 to 6 which are the same or equivalent to those according to FIGS. 1 to 3 are provided with the same reference numbers.

The cylinder 1' which is again rectangular in its cross-section has a lower side 8' and the walls 9', 10', 13' and 14'. The piston 2' moves between these walls. The sleeve 3 is arranged between the surfaces 11' and 12' of the walls 9' and 10'. The sleeve 3 rests against a stop 23 which is fixed to the casing on the side opposite to the lower side 8'. A screw bolt 5' is bolted into this stop 23 which is rigidly connected with the casing 1. A return spring 4' is arranged between the bottom of the pocket borehole 19' and the head 20' of the screw bolt 5'. Two spring piles 24, 25 are arranged between grooves 26 on the lower side 8' and grooves 27 on the inside of the piston 2'. These spring piles 24, 25 consist of springy flat springs, for example, of rolled steel tape material. When at rest, they are straight springs as is shown in FIG. 4. When at rest, these spring piles 24, 25 rest against the sleeve 3 and against the stop 23.

In the position according to FIG. 4, these spring piles 24, 25 hold the piston 2' in the shown position. The latter is, therefore, moved out of the cylinder 1' and is in a clamping position when the device is used as a clamping cylinder.

When the piston 2' is to be moved into the interior of the cylinder 1', a pressure agent is supplied to the interior 7 of the sleeve 3 whereby the sleeve 3 pushes the spring piles 24, 25 towards the outside with its own outer sides as it is shown in FIG. 5. The piston 2' is moved into the interior of the cylinder 1' by the return spring 4'.

With the position shown in FIG. 4, the piston 2' is suitable to press against any objects and thus to clamp them tightly. When the objects clamped by the piston 2' shall then be released, a pressure agent is fed into the interior 7 of the sleeve 3 whereby the piston 2' releases the object which it has held (FIG. 5).

In the case of the design according to FIGS. 7 and 8, a piston 2" is arranged in the interior of the cylinder 1, being rectangular in its cross-section, which can be moved back and forth. This piston 2" whose cross-section is also rectangular has a piston rod 30 which is guided in a borehole 31 at one end of the cylinder 1. A pressure spring 4" is arranged between this end of the cylinder 1 and the piston 2".

Two knuckle joint mechanisms 32 are provided between the piston 2" and the lower side 8" of the cylinder 1. These two knuckle joint mechanisms 32 rest, on the one hand, against grooves 27' on the piston 2" and, on the other hand, in grooves 26' on the lower side 8". The two knuckle lever joint mechanisms 32 consist each of a first lever 33 and a second lever 34 whereby the knuckle joint is formed by a wedge-shaped cut on the lever 34 into which a rounded portion on the lever 33 engages.

The sleeve 3 is arranged between the two joint mechanisms 32, the lower side 8" and the stop 23' fastened to the casing. This elastic sleeve 3 which is annular-shaped when at rest has sealing lips 16 at the inside on its edges which rest against the walls 9, 10 of the cylinder 1 running in parallel towards each other. The originally round sleeve 3 rest against the joint mechanisms 32 which, when at rest, are bent against the sleeve 3.

When the interior 7 of the sleeve 3 is not acted upon by the pressure agent, the spring 4" holds the piston 2", the lever mechanisms 32 and thus the sleeve 3 in the position shown in FIG. 7.

When the interior 7 of the sleeve 3 is acted upon by the pressure agent through the connection 17, the inner volume of the sleeve 3 increases. Since the sleeve 3 rests against the stop 23' and against the lower side 8", the volume can only increase by moving the areas of the sleeve 3 resting against the joint mechanisms 32 laterally towards the outside whereby the knuckle joint mechanisms 32 are given an elongated shape. In this way, the piston 2" is moved towards the outside out of the cylinder 1 with its piston rod 30. When the sleeve 3 is relieved of the pressure agent, the spring 4" returns the piston 2", the lever mechanisms 32 and the sleeve 3 into the shown initial position.

The stroke movement can be limited by stops 35 in the cylinder chamber whereby the elongation of the lever mechanisms 32 is limited. These stops 35 can be adjustable. They are preferably adjusted in such a way that a full elongation cannot be achieved so as to guarantee that the spring 4" returns the lever mechanisms 32 into the shown initial position.

However, a dead center or beyond dead center position which might possibly be desired relative to a special clamping problem shall not be excluded with it. In this instance, the releasing of the beyond dead center position can be effected with the help of mechanical means from outside or by having a pressure agent act on the knuckle lever parts from the outside or such.

The sleeve which consists of an elastic plastic material can have a jacket of spring plate.

The stop 23' on the side of the cylinder chamber is not absolutely necessary. The sleeve 3 can rest there against the piston 2".

When the inside 7 of the sleeve 3 is acted upon, the piston rod 30 performs a relatively slight stroke. However, the piston force is 10 to 15 times greater in comparison with a cylinder of the same structural size where the inside of the piston 2" is directly acted upon by the pressure agent. This is achieved by the knuckle joint lever mechanisms 4 arranged in the interior of the cylinder 1.

The alternative shown in FIGS. 9 and 10 differs from the preceding alternative in the first place in that two curved springs 36 are used instead of the knuckle joint mechanisms 32. With the pressure acting on the inside 7 of the sleeve 3, the sleeve 3 is given an elongated shape whereby the piston 2" performs a relatively slight stroke with its piston rod 30 at a high force. In this exemplified embodiment, the sleeve 3 is in contact with the piston 2". In its most simple design, the cylinder may have only one lever mechanism 32 or 26, respectively, for example, the right hand lever mechanism 32 in FIG. 7.

With regard to the designs according to FIGS. 4 to 10, such designs are also included in which the piston 2 performs a swivel movement relative to the cylinder 1 and no axial movement. For this purpose, the piston 2 is not guided between the walls 13, 14 but, for example, is connected in a joint manner with one of these walls, for example, the wall 14 by means of a hinge. Either a spring pile 24 or a flat spring 36 or a knuckle joint mechanism 32 is arranged between the sleeve 3 and the opposite wall 13 and between the lower side 8 of the cylinder 1 and the piston 2. Thus, the jacket surface of the sleeve 3 is surrounded by the wall 14, the lower side 8, the springs or the knuckle joint mechanism and the piston 2. When pressure acts then on the sleeve 3, the piston 2 performs a swivel movement around the hinge owing to the deformation of the springs 24 or 36 or the elongation of the knuckle joint mechanism 32.

I claim:

1. A device for producing mechanical force by means of a pressure fluid comprising:
   (a) a cylinder (1) having two side walls (9, 10) with surfaces (11, 12) which are plain-parallel to each other and having a lower side wall (8) at right angle to said two side walls (9, 10);
   (b) a piston (2) in said cylinder (1) between said two surfaces (11, 12) and guided by said cylinder (1) for movements along said two surfaces (11, 12);
   (c) an elastic cylindrical sleeve (3) having two opening edges, said sleeve being arranged in said cylinder (1) between said lower side wall (8) and said piston (2) with its edges in sealing contact with said two surfaces (11, 12);
   (d) at least one bore (17) for said pressure fluid in one of said two side walls (9, 10) communicating with the interior (7) of said sleeve (3);
   (e) flat springs (24, 25, 36) being arranged between said lower side wall (8) and said piston (2) and resting against an area of the outer surface of said sleeve (3) to deform said sleeve (3);
   said flat springs (24, 25, 36) being deformed by said sleeve (3) when pressure fluid is supplied in its interior (7) increasing its volume by moving said area laterally towards said flat springs (24, 25, 36), whereby piston (2) moves as a result of the deformation of said flat springs (24, 25, 36).

2. A device as claimed in claim 1 in which flat springs (36) are arranged on opposite sides of said sleeve (3) which, when the interior (7) of said sleeve (3) is not acted upon by said pressure fluid, are curve-bowed towards each other and towards said sleeve (3).

3. A device as claimed in claim 1 in which flat springs (24, 25) are arranged on opposite sides of said sleeve (3) which, when the interior (7) of said sleeve (3) is not acted upon by said pressure fluid, are stretched in a straight line.

4. A device as claimed in claim 2 in which grooves (26', 27') are provided on said lower side wall (8) and on said piston (2) in which the ends of said flat springs (36) are arranged.

5. A device as claimed in claim 3 in which grooves (26, 27) are provided on said lower side wall (8) and on said piston (2) in which the ends of said flat springs (24, 25) are arranged.

6. A device as claimed in claim 1 in which said sleeve (3) has sealing lips (16) on the open edges.

7. A device as claimed in claim 1 in which at least one return spring (4) is provided between said cylinder (1) and said piston (2) for moving said piston (2) into said cylinder (1).

8. A device as claimed in claim 1 in which a block (22) partially filling the interior (7) of said sleeve (3) is arranged between said parallel surfaces (11, 12) of said cylinder (1).

9. A device as claimed in claim 1 in which a stop (23) is provided in the cylinder (1) between said sleeve (3) and said piston (2).

* * * * *